(12) United States Patent
Ratcliffe et al.

(10) Patent No.: US 8,689,620 B2
(45) Date of Patent: Apr. 8, 2014

(54) PRESSURE BALANCING DEVICE

(75) Inventors: James David Ratcliffe, Hook (GB); Nicholas Peter Broom, Hook (GB); Timothy Michael Gill, Hook (GB)

(73) Assignee: Sondex Wireline Limited (GB)

( * ) Notice: Subject to any disclaimer, the term of this patent is extended or adjusted under 35 U.S.C. 154(b) by 399 days.

(21) Appl. No.: 13/099,471

(22) Filed: May 3, 2011

(65) Prior Publication Data
US 2011/0277545 A1 Nov. 17, 2011

(30) Foreign Application Priority Data
May 11, 2010 (GB) .................................. 1007811.1

(51) Int. Cl.
*E21B 47/06* (2012.01)

(52) U.S. Cl.
USPC ........................................................ 73/152.51

(58) Field of Classification Search
USPC ................ 73/152.51–152.53, 299–303
See application file for complete search history.

(56) References Cited

U.S. PATENT DOCUMENTS

| | | | | |
|---|---|---|---|---|
| 1,396,844 A | * | 11/1921 | Huffman | 73/302 |
| 1,661,995 A | * | 3/1928 | Brown | 73/299 |
| 3,213,414 A | * | 10/1965 | Moser | 181/106 |
| 3,633,414 A | * | 1/1972 | Field et al. | 73/152.51 |
| 3,744,307 A | * | 7/1973 | Harper et al. | 73/152.51 |
| 3,810,387 A | * | 5/1974 | Stancliff | 73/152.53 |
| 3,851,717 A | | 12/1974 | Berryman | |
| 4,227,410 A | * | 10/1980 | Ruben et al. | 73/301 |
| 4,252,015 A | * | 2/1981 | Harbon et al. | 73/152.51 |
| 4,266,606 A | * | 5/1981 | Stone | 166/113 |
| 4,358,956 A | * | 11/1982 | Ruben et al. | 73/301 |
| 4,359,899 A | * | 11/1982 | Claycomb | 73/152.48 |
| 4,805,448 A | * | 2/1989 | Armell | 73/152.53 |
| 4,865,125 A | | 9/1989 | De Cuir | |
| 5,024,098 A | * | 6/1991 | Petitjean et al. | 73/729.2 |
| 5,983,716 A | * | 11/1999 | Felder et al. | 73/302 |
| 6,481,495 B1 | | 11/2002 | Evans | |
| 6,988,551 B2 | | 1/2006 | Evans | |
| 7,290,604 B2 | | 11/2007 | Evans | |
| 7,311,149 B2 | | 12/2007 | Evans | |
| 7,559,361 B2 | | 7/2009 | Obrejanu | |
| 2005/0092484 A1 | | 5/2005 | Evans | |

* cited by examiner

*Primary Examiner* — John Fitzgerald
(74) *Attorney, Agent, or Firm* — Global Patent Operation; Joanna M. Dombrowski

(57) ABSTRACT

A pressure balancing device for a transducer is provided. The pressure balancing device comprises: a pressure transmission device having a cross-sectional area and arranged, in use, to be exposed to a fluid; and a fluid chamber having a hollow shaft, the fluid chamber being arranged to be acted on by the pressure transmission device; wherein the cross-sectional area of the hollow shaft is less than the cross-sectional area of the pressure transmission device.

20 Claims, 2 Drawing Sheets

PRESSURE BALANCING DEVICE

BACKGROUND OF THE INVENTION

1. Field of the Invention

Embodiments of the present invention relate to a pressure balancing device, such as for a transducer.

2. Description of the Prior Art

Downhole logging tools are frequently designed to be pressure balanced. This is where a measurement sensor is located within the body of the tool and is protected from well fluid by appropriate sealed housings, but where some form of pressure transmission device is used to compress a fluid within the tool to approximately the same pressure as the well fluid outside. In this manner, the sensor is exposed to the well pressure, without suffering the consequences of being immersed directly in the well fluid. The compensating mechanism must also allow for the internal fluid to expand at low pressure but high temperature.

Pressure compensating mechanisms regularly used downhole include pistons, rubber bladders and flexible metal bellows. Each mechanism has advantages and disadvantages in terms of the resulting pressure difference between the inside and outside of the tool, such as maintainability, cost, durability and resistance to attack from the chemicals in the well. Of these methods, compensating pistons are often used, due to their simple design and rugged construction. However, inherent in the design of a piston compensating system is the need for dynamic sliding seals, which experience high hydrostatic pressures and therefore suffer from high friction, and resist the motion of the piston. This resistance to motion results in a differential pressure across the piston, which corresponds to a minimum force required to move the piston against its seals. The higher the seal friction, the larger the differential pressure will be between the inside and the outside of the tool. In cases where the sensor inside the tool needs to be at the same pressure as the well fluid for accurate measurement, this differential pressure results in measurement error and is undesirable. In a similar manner both the bladder and the flexible metal bellows have stiffness in their structures, which resist motion and hence, generate a differential pressure.

A typical example of a downhole pressure sensitive device is a cable head load measuring tool. This tool is placed at the top of a logging tool string and is designed to report to the user the force being exerted on the tool string by the wireline or tractoring tool. Essentially, the tool must measure differential axial loading in the string, but not the axial load produced solely by the well pressure surrounding the string. Using a pressure balanced load measuring sensor is one solution, which inherently requires a good pressure compensating device.

SUMMARY OF THE INVENTION

In accordance with an embodiment of the present invention, a pressure balancing device for a transducer is provided. The pressure balancing device comprises: a pressure transmission device having a cross-sectional area and arranged, in use, to be exposed to a fluid; and a fluid chamber having a hollow shaft, the fluid chamber being arranged to be acted on by the pressure transmission device; wherein the cross-sectional area of the hollow shaft is less than the cross-sectional area of the pressure transmission device.

In accordance with an alternate embodiment of the present invention, a downhole tool comprising a pressure balancing device is provided. The pressure balancing device comprises: a pressure transmission device having a cross-sectional area and arranged, in use, to be exposed to a fluid; and a fluid chamber having a hollow shaft, the fluid chamber being arranged to be acted on by the pressure transmission device; wherein the cross-sectional area of the hollow shaft is less than the cross-sectional area of the pressure transmission device.

In accordance with an alternate embodiment of the present invention, a downhole load measuring tool comprising a pressure balancing device is provided. The pressure balancing device comprises: a pressure transmission device having a cross-sectional area and arranged, in use, to be exposed to a fluid; and a fluid chamber having a hollow shaft, the fluid chamber being arranged to be acted on by the pressure transmission device; wherein the cross-sectional area of the hollow shaft is less than the cross-sectional area of the pressure transmission device.

BRIEF DESCRIPTION OF THE DRAWINGS

Embodiments of the present invention will now be described, by way of example only, with reference to the accompanying drawings, in which.

DETAILED DESCRIPTION OF THE INVENTION

The embodiments of the present invention provide an improved downhole tool pressure balancing method for transducers, which is sensitive to differential pressure between an oil well for example and the tool interior. Using established pressure balancing mechanisms such as pistons, flexible bellows and rubber bladders, the area ratio of the compensation device and a shaft passing through a mandrel is carefully controlled so as to reduce the impact of differential pressure created by compensator friction or stiffness on the induced transducer error. The hollow shaft may be a load transmission shaft which may be connected to a load sensor.

The area ratio of the piston and the mandrel around the shaft have a ratio smaller than 1, such as less than 0.8 or less then 0.7, for example rather than equal to 1. This reduces the effect of the compensator/pressure transmission device friction/stiffness on the measured variable.

The improved pressure balancing configuration allows pressure sensitive transducers to suffer less measurement error than a conventional pressure balancing system. In the case of the cable head load measuring tool, the configuration results in increased accuracy and reduced hysteresis due to pressure changes over a system using a conventional pressure compensator.

Increased accuracy makes the use of the device in a downhole tool such as a downhole load measuring tool significantly more attractive to users as they can more confidently measure the load being exerted on the toolstring and predict when the cable head will reach breaking point. Balancing the load between the wireline and tractor during deviated well operations, can also be controlled more successfully.

Figure 1:
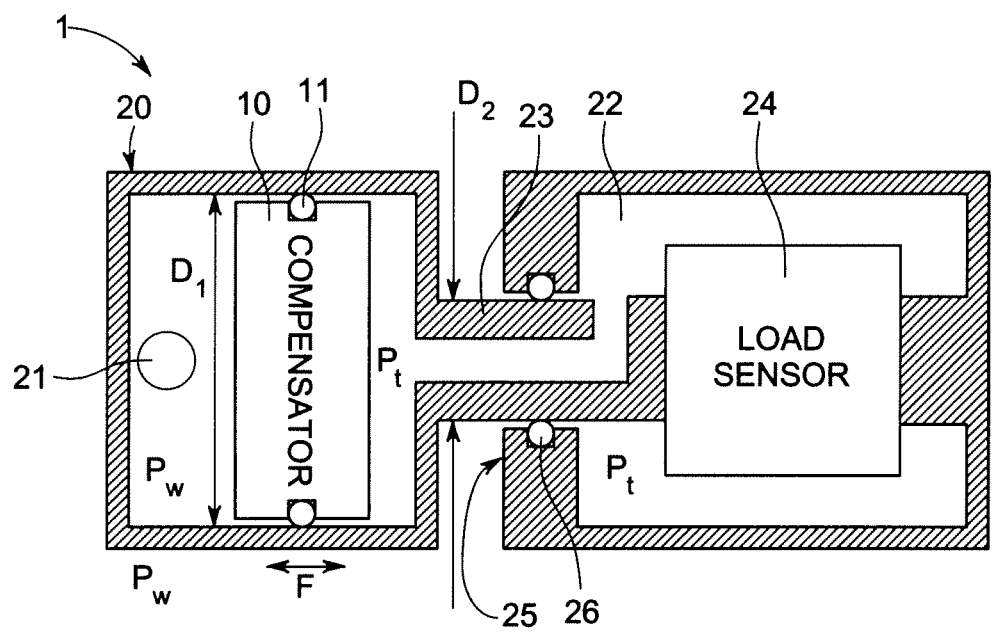
FIG. 1 shows a first example of a pressure balancing device for a transducer.

As shown in FIG. 1, the pressure balancing device 1 of this example has a pressure transmission device 10, which in this example is a piston, provided in a housing 20. Instead of a piston, the pressure transmission device 10 could for example be a rubber bladder or a flexible metal bellows. The piston is sealed against the inside surface of the housing 20 by a seal 11. The device 1 is exposed to external pressure $P_w$ through inlet 21. The pressure balancing device 1 has a sealed chamber 22 with internal pressure $P_t$. The chamber 22 has a hollow shaft 23 and a transducer 24. Movement of the pressure transmission device 10 may direct internal fluid through the hollow shaft 23 into or out of the sealed chamber 22. In this example the transducer 24 is a load sensor and the hollow shaft 23 is a load transmission shaft. The device 1 may be arranged to measure a load across it in the direction of the shaft 23. In this example the shaft 23 is arranged to pass through a mandrel 25 which has an O ring seal 26. The piston 10 is moved back and forth as shown by arrow F depending upon the external pressure $P_w$ and internal pressure $P_t$ with resistance force F to motion/deformation of the piston/pressure transmission device 10. Various characteristics shown in the figure are defined as follows:

$D_1$ is the diameter of the piston.

$D_2$ is the diameter of the hollow load transmission shaft.

$P_w$ is the external pressure, for example the pressure in a well.

$P_t$ is the internal tool pressure.

F is the resistance force to motion/deformation of the compensator.

Depending on the exact configuration of the mechanism, the piston diameter $D_1$ will have a cross-sectional area $A_1$ associated with it. Similarly, the load transmission shaft will have a cross sectional area $A_2$ associated with diameter $D_2$. If the error induced in the sensor due to differential pressure between the inside and the outside of the tool is e and the ratio of areas is R, then:

Differential Pressure $$\Delta P = P_w - P_t$$

Differential Pressure to Drive Piston $$\Delta P = \frac{F}{A_1}$$

Measurement Error $$e = \Delta P A_2$$

Therefore:

$$e = \frac{F A_2}{A_1}$$

And if $$R = \frac{A_2}{A_1}$$

Then $$e = RF$$

Therefore, for the error e to be smaller than the resistance force F, R<1.

This implies that to reduce the effect of the piston/compensator 10 on the measured force, the compensator area should be large, while the load transmission shaft area should be small. Taken to the extreme case, with an infinitely large compensator or an infinitely small shaft, the error will be zero. In practice, this ideal case is impossible to achieve and generally, with the limitations on diameter which are experienced in downhole tool design, the area of the shaft 23 is preferably at least a minimum amount to provide sufficient strength and robustness for the intended use, such as in a downhole tool. The areas of the pressure transmission device $A_1$ and the shaft $A_2$ are preferably within an order of magnitude of each other. Therefore, embodiments of this invention consider the case when R is smaller than 1, which produces overall error reduction.

Figure 2:
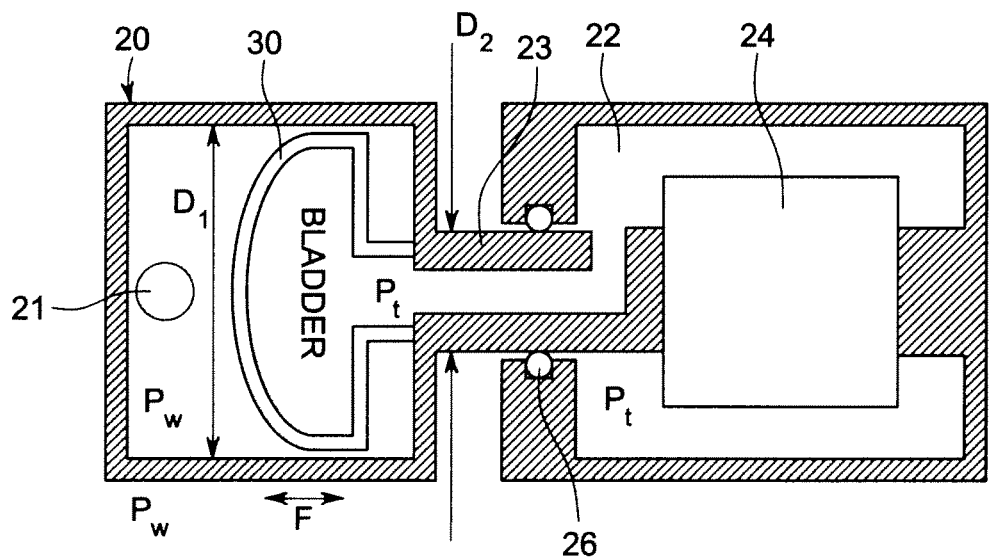
FIG. 2 shows a second example of a pressure balancing device for a transducer.

FIG. 2 shows a further example of a pressure balancing device in accordance with the embodiments of the present invention. The device of FIG. 2 is very similar to that to FIG. 1, except instead of using a piston, a bladder 30 is used as the pressure transmission device 10. The same principles as explained with FIG. 1 are also applicable to the example of FIG. 2 except with the cross-sectional area $A_1$ being the effective cross-sectional area of the bladder 30 exposed to the external pressure $P_w$ via inlet 21.

Figure 3:
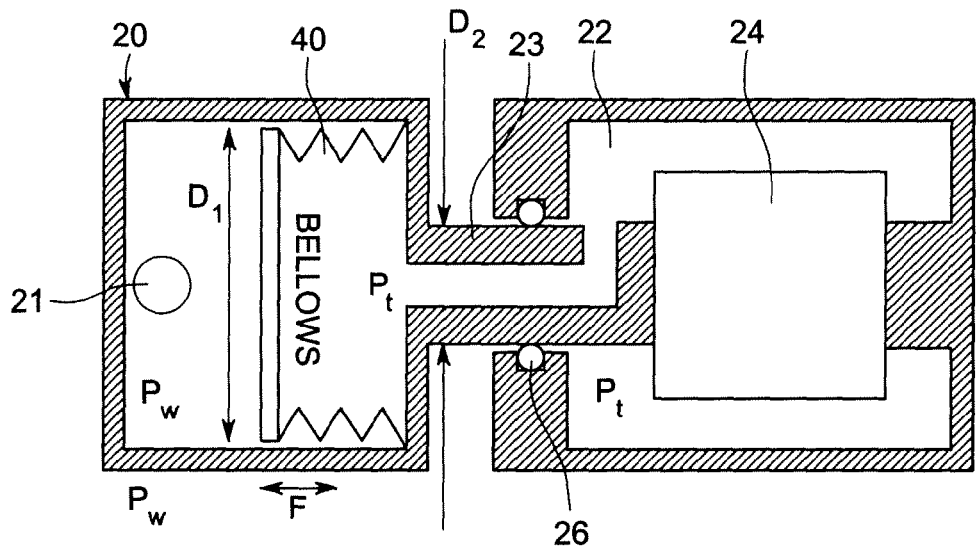
FIG. 3 shows a third example of a pressure balancing device for a transducer.

FIG. 3 is a further example of a pressure balancing device 1, except instead of using a piston or bladder, a bellows 40 is used as the pressure transmission device. Like the examples of FIGS. 1 and 2, the effective cross-sectional area $A_1$ of the bellows 40 is larger than the cross-sectional area of the hollow shaft $A_2$ resulting in a reduced error e for the device.

Some experiments were performed on a pressure balancing device 1 as shown in our FIG. 1 with a cross-sectional area $A_1$ of the pressure transmission device 10 of 725 mm² with the pressure balancing device 1 subjected to a driving force F of 1 Newton. The pressure balancing device 1 was fitted with hollow shafts 23 of differing cross-sectional areas $A_2$ as listed in Table 1 below and the measurement error in Newtons determined for each hollow shaft 23.

TABLE 1

| A2 (mm^2) | Area Ratio R (A2/A1) | Measurement error (N) (=RxF) |
|---|---|---|
| 444 | 0.612413793 | 0.612413793 |
| 400 | 0.551724138 | 0.551724138 |
| 300 | 0.413793103 | 0.413793103 |
| 200 | 0.275862069 | 0.275862069 |
| 100 | 0.137931034 | 0.137931034 |

A1 (mm^2) 725
Driving force F (N) 1

Figure 4:
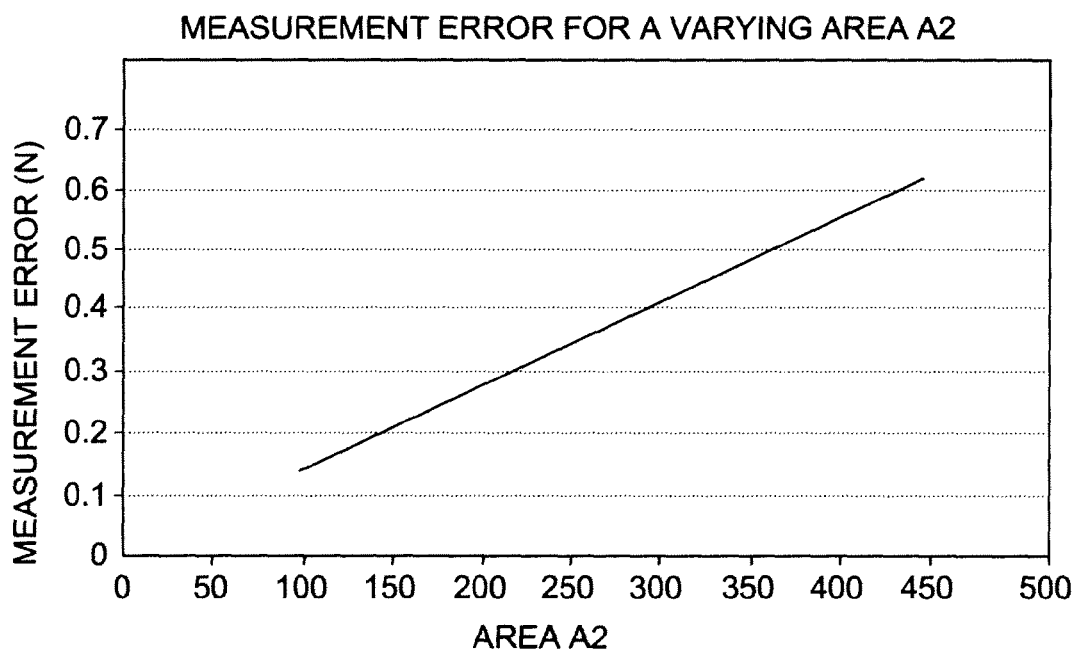
FIG. 4 shows the resulting error (e) for a pressure balancing device with hollow shafts of various cross-sectional areas ($A_2$)

The results are also presented graphically in FIG. 4. As can be seen from Table 1 and FIG. 4, the measurement error is reduced as the area Ratio is reduced, in this example by reducing the area of the cross-section of the hollow shaft 23. The area ratio ($A_2/A_1$) may be equal to or less then 0.8, 0.7, 0.6, 0.5, 0.4, 0.3, 0.2 or 0.1 for example.

We have found that whilst reducing the area ratio ($A_2/A_1$) reduces the error, reducing the cross-sectional area of the hollow shaft too far may compromise the mechanical strength and robustness of the pressure balancing device. In practice, it has been found to be preferable to maintain the area ratio ($A_2/A_1$) at 0.1 or greater.

Whilst the examples provided in Table 1 above are for a pressure balancing device 1 with the pressure transmission device 10 having a cross-sectional area of 725 mm², clearly the examples of the embodiments of the present invention could be used with a pressure balancing device 1 having a pressure transmission device 10 of any appropriate cross-sectional area $A_1$. In practice, the pressure transmission device 10 may have as large a cross-sectional area $A_1$ as can be practically or conveniently provided. However, the cross-sectional area $A_1$ of the pressure transmission device 10 would, in practice, probably be limited by the particular application in which it is being used and the available space for the pressure balancing device 1. For example, if used in a downhole tool then the cross-sectional area will be limited by the available space in the tool and is likely to be a few 1000 mm$^2$ or less.

Many variations may be made to the examples described above while still falling within the scope of the embodiments of the present invention. For example, whilst the pressure balancing devices of FIGS. 1 to 3 have been described for use in a downhole tool, such as a downhole load measuring tool, the pressure balancing devices may be used in any application. it is also noted that whilst the examples of the pressure balancing device have been used with a load sensor as a transducer, any appropriate transducer may be used in appropriate circumstances, such as a pressure transducer for example.

What is claimed is:

1. A pressure balancing device for a transducer, the pressure balancing device comprising:
   a pressure transmission device having a cross-sectional area and arranged, in use, to be exposed to a fluid; and
   a fluid chamber having a hollow shaft, the fluid chamber being arranged to be acted on by the pressure transmission device, and the fluid chamber being fluidly coupled with the pressure transmission device and a load sensor;
   wherein the cross-sectional area of the hollow shaft is less than the cross-sectional area of the pressure transmission device.

2. A pressure balancing device according to claim 1, wherein the pressure transmission device is a piston.

3. A pressure balancing device according to claim 1, wherein the pressure transmission device is a diaphragm.

4. A pressure balancing device according to claim 1, wherein the pressure transmission device is a bellows.

5. A pressure balancing device according to claim 1, wherein the ratio of the cross sectional area of the hollow shaft to the cross-sectional area of the pressure transmission device is 0.8 or less.

6. A pressure balancing device according to claim 1, wherein the ratio of the cross-sectional area of the hollow shaft to the cross-sectional area of the pressure transmission device is 0.7 or less.

7. A pressure balancing device according to claim 1, wherein the hollow shaft is a load transmission shaft.

8. A pressure balancing device according to claim 7, wherein the load transmission shaft is connected to the load sensor.

9. A downhole tool comprising a pressure balancing device, the pressure balancing device comprising:
   a pressure transmission device having a cross-sectional area and arranged, in use, to be exposed to a fluid; and
   a fluid chamber having a hollow shaft, the fluid chamber being arranged to be acted on by the pressure transmission device, and the fluid chamber being fluidly coupled with the pressure transmission device and a load sensor;
   wherein the cross-sectional area of the hollow shaft is less than the cross-sectional area of the pressure transmission device.

10. The downhole tool according to claim 9, wherein the ratio of the cross-sectional area of the hollow shaft to the cross-sectional area of the pressure transmission device is 0.8 or less.

11. The downhole tool according to claim 9, wherein the ratio of the cross-sectional area of the hollow shaft to the cross-sectional area of the pressure transmission device is 0.7 or less.

12. The downhole tool according to claim 9, wherein the pressure transmission device is a piston.

13. A downhole load, measuring tool comprising a pressure balancing device, the pressure balancing device comprising:
   a pressure transmission device having a cross-sectional area and arranged, in use, to be exposed to a fluid; and
   a fluid chamber having a hollow shaft, the fluid chamber being, arranged to be acted on by the pressure transmission device, and the fluid chamber being fluidly coupled with the pressure transmission device and a load sensor;
   wherein the cross-sectional area of the hollow shaft is less than the cross-sectional area of the pressure transmission device.

14. The downhole load measuring tool according to claim 13, wherein the pressure transmission device is a piston.

15. The downhole load measuring tool according to claim 13, wherein the pressure transmission device is a diaphragm.

16. The downhole load measuring tool according to claim 13, wherein the pressure transmission device is a bellows.

17. The downhole load measuring tool according to claim 13, wherein the ratio of the cross-sectional area of the hollow shaft to the cross-sectional area of the pressure transmission device is 0.8 or less.

18. The downhole load measuring tool according to claim 13, wherein the ratio of the cross-sectional area of the hollow shaft to the cross-sectional area of the pressure transmission device is 0.7 or less.

19. The downhole load measuring tool according to claim 13, wherein the hollow shaft is a load transmission shaft.

20. The downhole load measuring tool according to claim 19, wherein the load transmission shaft is connected to the load sensor.

* * * * *